Oct. 30, 1951 W. L. HAND 2,573,663
CONTROL DEVICE FOR HEAT EXCHANGE SYSTEMS
Filed Nov. 30, 1945 2 SHEETS—SHEET 1
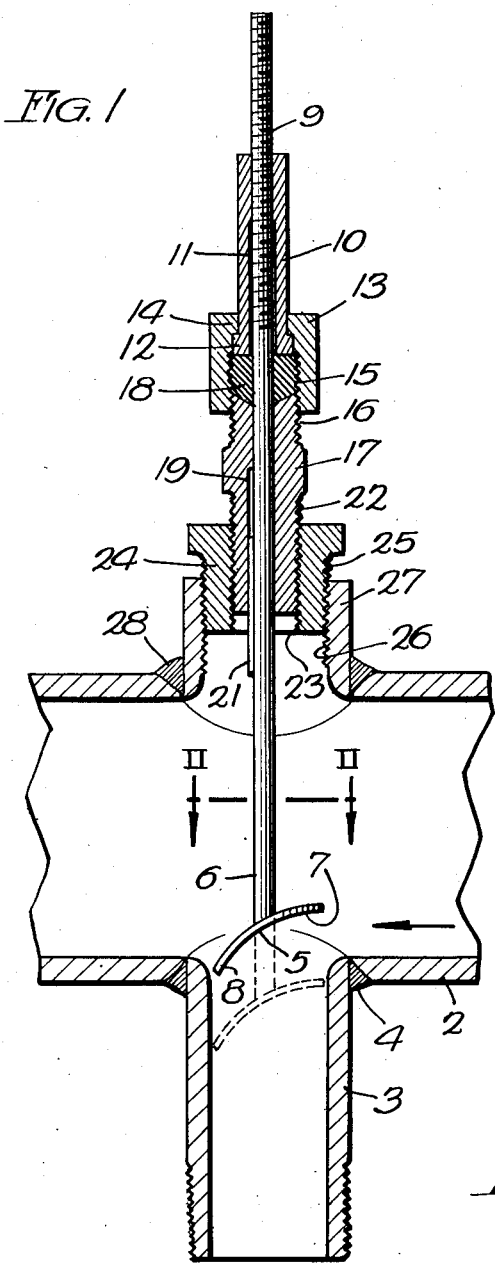
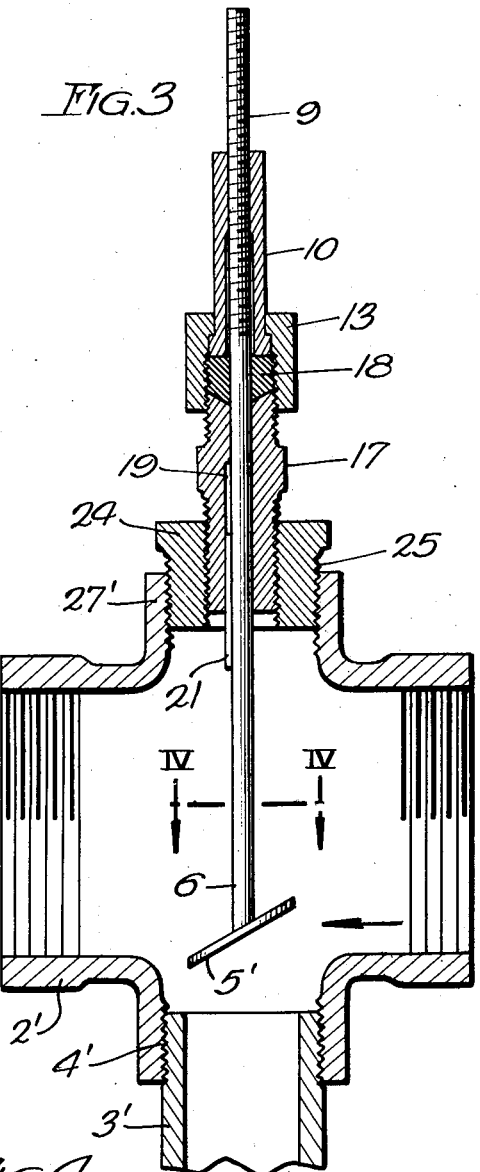
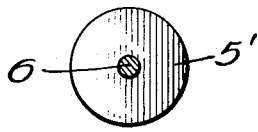
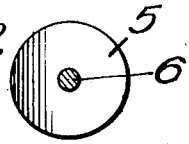
INVENTOR
WILLIAM LOUIS HAND
By Schneider & Dressler
ATTY.

Oct. 30, 1951      W. L. HAND      2,573,663
CONTROL DEVICE FOR HEAT EXCHANGE SYSTEMS
Filed Nov. 30, 1945      2 SHEETS—SHEET 2
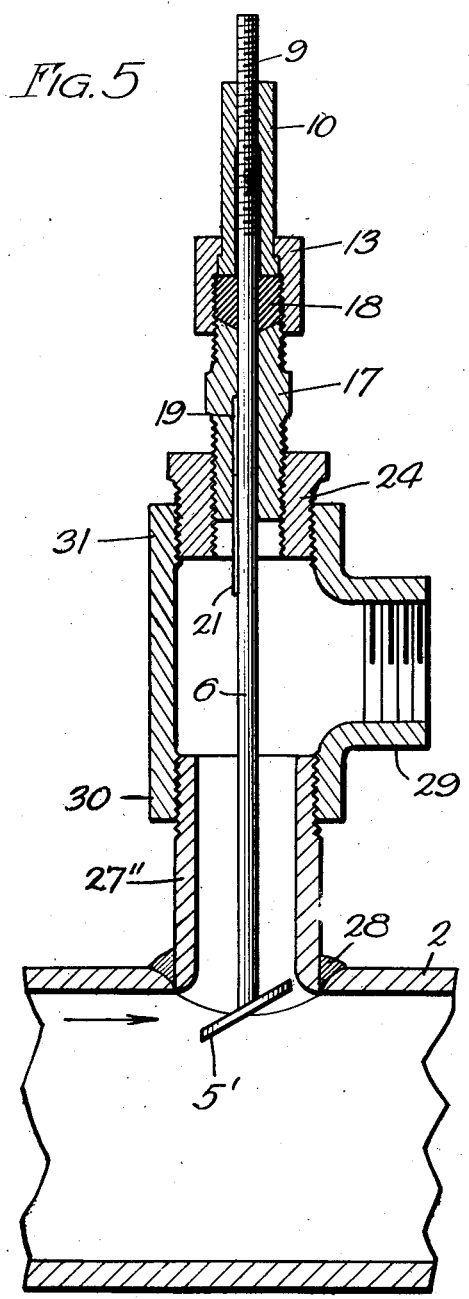
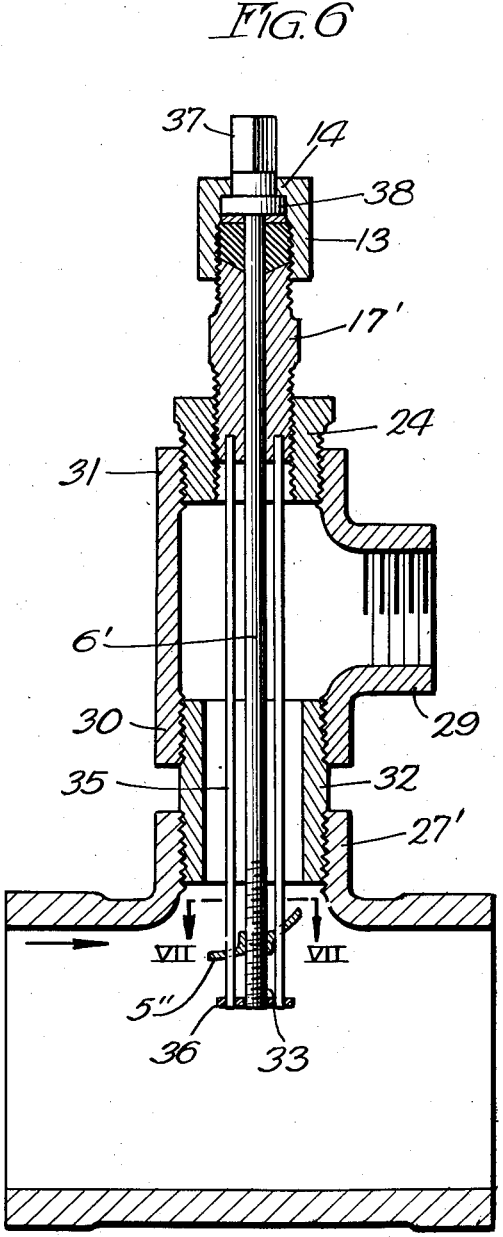
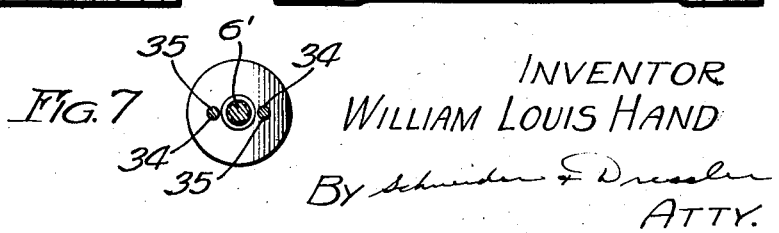
INVENTOR
WILLIAM LOUIS HAND Patented Oct. 30, 1951

2,573,663

UNITED STATES PATENT OFFICE 2,573,663

CONTROL DEVICE FOR HEAT EXCHANGE SYSTEMS

William Louis Hand, Chicago, Ill.

Application November 30, 1945, Serial No. 631,903

3 Claims. (Cl. 138—37)

This invention relates to flow control devices for fluid heat exchange systems. Although the flow control device is particularly designed for use in diverting a liquid heat transfer medium from a main line to a branch line, it may be used to control the flow of any fluid through a pipe system.

The diversion of fluid has been accomplished in the past by means of an interceptor scoop as disclosed in my prior Patent No. 2,380,839, granted July 31, 1945. In the present invention I have devised a deflector plate and means for varying its position in the system to control the flow of fluid. The deflector plate is an inexpensive structure, easy to operate and requires a minimum of attention after it has been installed in a heating or cooling system. Other advantages and objects of this invention will become apparent upon reading the following description in conjunction with the accompanying drawings, in which:

Fig. 1 is a fragmentary cross sectional view of a heat exchange system showing one embodiment of my flow control device;

Fig. 2 is a cross sectional view taken along the line II—II of Fig. 1;

Fig. 3 is a view, similar to Fig. 1, showing another embodiment of my flow control device;

Fig. 4 is a cross sectional view taken along the line IV—IV of Fig. 3;

Fig. 5 is a view, similar to Fig. 3, showing a different arrangement of pipes;

Fig. 6 is a view, similar to Fig. 5, showing another embodiment of my flow control device; and Fig. 7 is a cross sectional view taken along the line VII—VII of Fig. 6.

In the drawings, the reference numerals 2 and 3 indicate a main pipe and a branch pipe, respectively. These pipes are of conventional structure and may be made of any suitable material. In Fig. 1 the pipes are indicated as being welded together as at 4, but in Fig. 3 they are cast in sections 2', 3' having threaded ends 4'.

The flow control device comprises a deflector plate 5 rigidly secured to one end of a stem 6. In the embodiment of Fig. 1 the deflector plate is circular in elevation, as indicated in Fig. 2, and is curved along an axis parallel to the main pipe 2 so as to appear arcuate as viewed in Fig. 1, with the edge 7 closest to the source of the fluid higher than the more remote edge 8. The arrow indicates the direction of fluid in the main pipe.

When the deflector plate is in its lowermost position, indicated in dotted lines in Fig. 1, the branch pipe is substantially closed off so that only a small amount of fluid will flow from the main pipe into the branch. When the deflector plate is raised to a position high enough for the edge 7 to project above the bottom of the inner circumference of the main pipe a portion of the fluid flowing through the main pipe comes into contact with the under surface of the deflector plate. The shape of the deflector plate and the angle at which it is positioned causes the fluid coming into contact with it to be diverted downwardly. Until the edge 8 of the deflector plate is moved above the bottom of the inner circumference of the main pipe substantially all of the fluid coming into contact with the deflector plate will be diverted into the branch pipe.

As the deflector plate is raised still higher some of the fluid contacting the deflector plate may be forced past the edge 8 through the main pipe by the pressure of the fluid flowing in that direction, but the proportion of fluid forced past the edge 8 in this manner will remain small until the edge 8 is a substantial distance above the bottom of the main pipe. The proportion of fluid diverted into the branch pipe will depend upon the position of the deflector plate and can be regulated with reasonable accuracy by moving the deflector plate diametrically of the main pipe. As the deflector plate is moved from the branch pipe the proportion of fluid diverted to the branch pipe increases until a maximum is reached. The vertical movement of the stem 6 may be limited to prevent movement of the deflector plate beyond the point at which the maximum is reached. If the deflector plate can be raised beyond the point of maximum diversion the proportion of fluid diverted into the branch pipe will decrease gradually as the lower edge 8 of the deflector plate is raised above the mouth of the branch pipe.

The relative position of the deflector plate 5 is adjusted by manipulation of the stem 6. The free end portion of the stem 6 is provided with a thread 9 engaged by an interiorly threaded adjusting nut 10. The lower portion of the nut 10 is recessed, as indicated at 11, to provide clearance for the stem 6 at all points except where it engages the threaded portion of the nut. The bottom of the nut 10 is provided with a flange 12.

A nipple 13 constituting part of a stuffing box housing encircles the lower portion of the nut 10 and has a flange 14 resting on the top of the flange 12. The lower portion of the nipple 13 is provided with an interior thread 15 engaging an exterior thread 16 on a nipple or packing stem 17 constituting the other part of the stuffing box housing. The packing 18 fits inside the hollow chamber of the nipple 13 and is compressed by the top of the nipple 17. The stem 6 passes through the packing 18. The lower end of the nipple 17 is provided with a groove 19 and the stem 6 has a key 21 engaging the groove to prevent rotation of the stem 6 as the adjusting nut 10 is rotated.

The lower portion of the nipple 17 is provided with an exterior thread 22 engaging an interior thread 23 on a reducing nipple 24. The reducing nipple 24 is provided with an exterior thread 25 screwed into engagement with an interior thread 26 on a neck 27 extending from the main pipe at a point diametrically opposite the branch pipe 3. In Fig. 1 the neck 27 is indicated as being welded to the main pipe, as at 28. In the pipe structure shown in Fig. 3 the neck 27' is cast integrally with the main pipe section 2'. It will be observed that the specific structure of the main pipe 2 or 2', the branch pipe 3 or 3', and the neck 27 or 27' is not essential to the invention and either structure may be used with any specific form of the flow control device. As is manifest, the various pipes and pipe fittings are conventional.

The structure of the flow control device shown in Fig. 3 is a duplicate of that disclosed in Fig. 1 except that a deflector plate 5' comprising a flat disk rigidly secured to the bottom of the stem 6 at an oblique angle replaces the curved deflector plate 5.

The embodiment shown in Fig. 5 is similar to that shown in Fig. 3 except that the position of the branch pipe relative to the main pipe is different. The branch pipe 29 is positioned between the main pipe 2 and the adjusting nut 10. The branch pipe 29 includes a T-pipe fitting having one end 30 threaded on the neck 27'' which is welded to the main pipe 2, as indicated at 28. In this structure the neck 27'' is actually part of the branch pipe because the fluid diverted from the main pipe 2 passes through the neck to the T-pipe fitting. The opposite end 31 of the T-pipe fitting is completely closed by the reducing nipple 24 which is threaded into it, the nipple 17 which is threaded into the reducing nipple 24, and the stem 6 which passes through the nipple 17. The rest of the structure of the embodiment of Fig. 5 is an exact duplicate of that disclosed in Fig. 2 and need not be described again.

In the embodiment illustrated in Fig. 6 the pipe sections are conventional cast T-pipe fittings instead of welded. The arrangement of the pipe sections is similar to that shown in Fig. 5; however, instead of being threaded directly on the neck, the T-pipe fitting 29, 30, 31 is threaded on a nipple 32 which is threaded into the neck 27'. In this embodiment the stem 6' is threaded on its lower portion, as indicated at 33, so that the deflector plate 5'', threaded thereon, moves vertically relative to the stem 6' as the stem is rotated. Although the deflector plate 5'' is illustrated as being curved, a flat plate may be used.

In order to prevent the deflector plate 5'' from becoming frozen on the threads 33 and rotating with the stem 6' the deflector plate is provided with a pair of apertures 34. A pair of rods 35, each having one end permanently secured to the packing stem or nipple 17', passes through the apertures 34. The rods serve as guide means for the deflector plate and hold it against rotation with the stem, thereby imparting longitudinal movement to the deflector plate as the stem 6' is rotated. The ends of the rods 35 are held in properly spaced relationship to the stem 6' by means of a disk 36 to which they are rigidly fixed in any suitable manner. The disk 36 also constitutes a stop to prevent the deflector plate 5'' from being screwed off the stem 6'.

The upper end of the stem 6' is provided with a head 37 permanently secured thereto. The head 37 is shown as being square to facilitate rotation thereof by means of a wrench or key, but it may be of any desired configuration. The lower portion of the head 37 is provided with a flange 38 which is positioned under the flange 14 of the nipple 13.

From the foregoing description of the various embodiments it will be apparent that in any embodiment the pipe sections may be welded or may be secured together in any conventional manner, and the deflector plate may be either flat or curved. The essential features of the deflector plate are that it must have a fixed angular relationship to the stem 6 or 6', must be movable diametrically relative to the main pipe, and must be of a size to fit loosely within the branch pipe in the embodiments such as shown in Figs. 1 and 3 and within the neck, which really are part of the branch pipe, in the embodiments where the branch line is positioned between the main pipe and the adjusting means, as in Figs. 5 and 6.

Although I have described several embodiments of my invention in considerable detail it will be understood that the description thereof is illustrative, rather than restrictive, as many details may be modified or changed without departing from the spirit or scope of my invention. Accordingly, I do not desire to be restricted to the exact structure described, except as limited by the appended claims.

I claim:

1. In a fluid heat exchange system, a main pipe, a neck opening in said main pipe, a rotatable stem passing through said neck into said main pipe, a deflector plate secured in oblique angular relationship to said stem, a nipple embracing one portion of said stem, and a rod secured to said nipple and passing through an aperture in said deflector plate to prevent rotation of said deflector plate with said stem.

2. In a fluid heat exchange system, a main pipe, a neck opening in said main pipe, a rotatable stem passing through said neck into said main pipe, a deflector plate secured in oblique angular relationship to said stem, and guide means imparting longitudinal movement to said deflector plate during rotation of said stem while retaining said deflector plate locked against rotary motion.

3. In a fluid heat exchange system, a plurality of pipes, a deflector plate in one of said pipes, said deflector plate having a plurality of apertures, one of said apertures being threaded, a stem threaded into said threaded aperture, a nipple, one end of said stem extending through said nipple and projecting out of said pipe, and a pair of guide rods, each of said guide rods having one end permanently secured to said nipple and its other end passing through each of the other of said apertures, said stem being operable to change the position of said deflector plate in said pipe.

WILLIAM LOUIS HAND.

REFERENCES CITED

The following references are of record in the file of this patent:

UNITED STATES PATENTS

| Number | Name | Date |
| --- | --- | --- |
| 508,584 | Stevens | Nov. 14, 1893 |
| 1,989,163 | Beck et al. | Jan. 29, 1935 |
| 2,281,178 | Wilkinson | Apr. 28, 1942 |
| 2,380,839 | Hand | July 31, 1945 |